United States Patent
Kusche

(10) Patent No.: US 10,308,887 B2
(45) Date of Patent: Jun. 4, 2019

(54) METHOD FOR CONDUCTING A HYDROTHERMAL CARBONIZATION REACTION

(71) Applicant: AVA Green Chemistry Development GmbH, Murchin-Relzow (DE)

(72) Inventor: Stepan Nicolja Kusche, Bad Schoenborn (DE)

(73) Assignee: AVA Green Chemistry Development GmbH, Murchin-Relzow (DE)

( * ) Notice: Subject to any disclaimer, the term of this patent is extended or adjusted under 35 U.S.C. 154(b) by 100 days.

(21) Appl. No.: 15/596,577

(22) Filed: May 16, 2017

(65) Prior Publication Data

US 2018/0237698 A1 Aug. 23, 2018

(30) Foreign Application Priority Data

Feb. 20, 2017 (EP) .................................. 17156932

(51) Int. Cl.
| | |
|---|---|
| *C10L 9/08* | (2006.01) |
| *C10L 5/44* | (2006.01) |
| *C10B 45/00* | (2006.01) |
| *C10B 49/02* | (2006.01) |
| *C10B 53/02* | (2006.01) |

(52) U.S. Cl.
CPC .............. *C10L 9/086* (2013.01); *C10B 45/00* (2013.01); *C10B 49/02* (2013.01); *C10B 53/02* (2013.01); *C10L 5/447* (2013.01); *C10L 2290/06* (2013.01); *C10L 2290/148* (2013.01); *C10L 2290/24* (2013.01); *C10L 2290/48* (2013.01); *C10L 2290/58* (2013.01); *C10L 2290/60* (2013.01); *Y02E 50/10* (2013.01); *Y02E 50/14* (2013.01); *Y02E 50/30* (2013.01)

(58) Field of Classification Search
CPC .......... C10L 9/086; C10B 49/00–49/04; C10B 49/08; C10B 49/12
See application file for complete search history.

(56) References Cited

U.S. PATENT DOCUMENTS

| | | | |
|---|---|---|---|
| 6,955,793 B1 | 10/2005 | Arencibia, Jr. | |
| 8,043,505 B2 | 10/2011 | Noguchi et al. | |
| 8,597,431 B2 | 12/2013 | McDonald et al. | |
| 9,238,583 B2 * | 1/2016 | Vyskocil | C10L 9/086 |
| 2006/0096163 A1 | 5/2006 | Dickinson et al. | |
| 2010/0162619 A1 | 7/2010 | Peus | |
| 2011/0056125 A1 * | 3/2011 | Antonietti | C10B 53/02 |
| | | | 44/605 |
| 2012/0042566 A1 | 2/2012 | MacKintosh | |
| 2015/0368104 A1 | 12/2015 | Vyskocil et al. | |

FOREIGN PATENT DOCUMENTS

| | | | | |
|---|---|---|---|---|
| CN | 105264048 A | | 1/2016 | |
| DE | 102007012112 | * | 5/2008 | ............... C10L 5/46 |
| DE | 10 2010 044 200 A1 | | 1/2012 | |
| DE | 10 2011 001 108 A1 | | 9/2012 | |
| DE | 10 2011 001 954 A1 | | 10/2012 | |
| WO | 2013/079063 A1 | | 6/2013 | |

OTHER PUBLICATIONS

English machine translation of DE 10 2007 012 112 B3, obtained from Google (Year: 2008).*
Brockhaus, Encyclopedia, in 30 volumes; 21st edition of 2006, total of 3 pages (including English translation of relevant term).

* cited by examiner

*Primary Examiner* — Renee Robinson
(74) *Attorney, Agent, or Firm* — Collard & Roe, P.C.

(57) ABSTRACT

During hydrothermal carbonization, biomass is converted to biocoal. The reaction yield depends on the reaction conditions, including duration of the carbonization reaction or time period within which the slurry composed of water and biomass remains in the reaction tank and is exposed to pressure and temperature. These conditions should be selected so that the greatest possible dry residue of carbonized material remains in the slurry. It has been shown that the dry residue amount changes during the carbonization reaction with a curve that is similar, to a great extent, to that of the slurry pH value. Because determining the dry residue is difficult during the ongoing reaction, but determining the pH value can be easy during the entire reaction period, the reaction is terminated at a maximum of the pH value corresponding to a maximum of the biocoal dry residue, to the greatest possible extent.

7 Claims, 1 Drawing Sheet

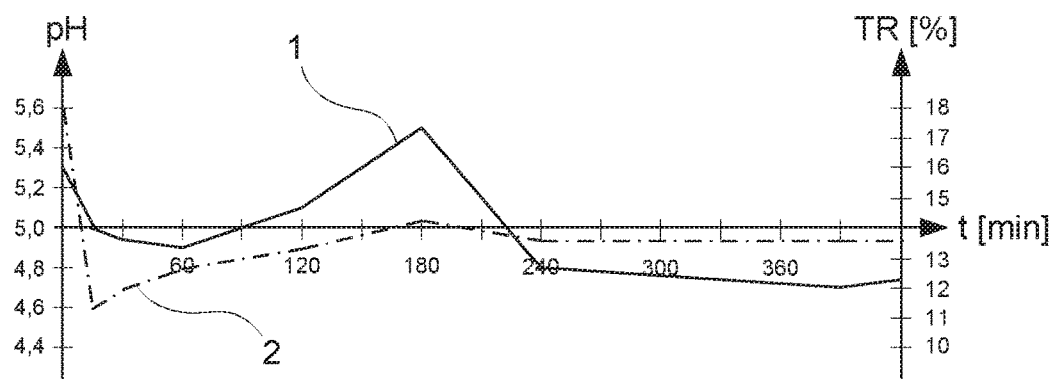

METHOD FOR CONDUCTING A HYDROTHERMAL CARBONIZATION REACTION

CROSS REFERENCE TO RELATED APPLICATIONS

Applicant claims priority under 35 U.S.C. § 119 of European Application No. 17156932.0 filed Feb. 20, 2017, the disclosure of which is incorporated by reference.

BACKGROUND OF THE INVENTION

1. Field of the Invention

The present invention relates to a method for conducting a hydrothermal carbonization reaction, in which biomass is supplied to a reaction tank. The reaction conditions with regard to pressure and temperature required for allowing a hydrothermal carbonization reaction to take place are created using the introduction of steam and maintained for a reaction period.

2. Description of the Related Art

Such methods are already known in varied ways in the state of the art, for example from DE 10 2011 001 954 A1. This document provides for undertaking mixing of the biomass and of the steam added to it while the hydrothermal carbonization is taking place, in order to make a large reaction surface and thereby a large attack surface for pressure and heat available on the basis of this mixing. It has been shown that a carbonization reaction that clearly starts faster and proceeds more uniformly takes place as a result.

The basis of the hydrothermal carbonization reaction is the biomass supplied, which usually contains lignin, in which the cellulose intended for carbonization is bound. At the beginning of the HTC process (hydrothermal carbonization process), hydrolysis first takes place, by way of which conversion of the cellulose to glucose takes place. In this regard, the glucose is dissolved in the process water. Within the process, hydrolysis requires only a short time, about one to two minutes. After hydrolysis of the cellulose and its conversion to glucose, the actual carbonization reaction then takes place.

As described in the special case of the document mentioned above, the actual carbonization reaction is accelerated there in that mixing of the biomass takes place. In this way, it is ensured that the required reaction conditions, namely a pressure of approximately 25 bar and a temperature of about 230° C., are accessible as uniformly as possible for the entire material to be processed.

After the actual carbonization, what is called condensation takes place as practically the last major step, in which the water-soluble carbon components are joined together to form larger molecules. The HTC coal subsequently forms from them. A measure of the solids component in the biomass mixture, called slurry, is the dry residue. This measure is defined as the proportion of dry mass as part of the entire mass of a slurry.

In the last step of the method, the biocoal that has been formed is separated from the process water that has also been formed, so that the dry residue can be removed as biocoal and the process water can be passed along to another use or used once again in the reaction. In this regard, it must regularly be taken into consideration that a certain proportion of carbon remains in the process water.

It must also be taken into consideration that a relatively long dwell time in the reaction tank, which allows a high yield of biocoal, logically leads to poorer capacity utilization of the reaction tank, so that here, too, the shortest possible dwell time would be useful, in the sense of an efficient solution.

SUMMARY OF THE INVENTION

It is the object of the present invention, against the background of these deliberations, to propose a method for conducting a hydrothermal carbonization reaction that allows a clear reduction in the dwell time of the slurry in the reaction tank and, at the same time, brings with it a higher yield of biocoal and thereby greater pollutant elimination from the process water.

These and other objects are accomplished, according to the invention, by a method for conducting a hydrothermal carbonization reaction, in which biomass is supplied to a reaction tank, wherein the reaction conditions with regard to pressure and temperature required for allowing a hydrothermal carbonization reaction to take place are created via the introduction of steam and maintained for a reaction period. During the reaction period, a slurry forms from the steam and the biomass that are introduced. The slurry is monitored with regard to the progression of the pH value, and the reaction is terminated as soon as it is determined that a maximum of this pH value has been exceeded. Further practical embodiments of such a method are discussed below.

According to the invention, a hydrothermal carbonization reaction takes place in a reaction tank, similar to the method of procedure in the state of the art, with biomass and steam being brought together. The biomass carbonizes under pressure and elevated temperature, and forms a dry residue during this process, which can be recovered from the slurry by separating it from the process water that occurs.

It has been shown, however, that the proportion of coal not soluble in water, which can be precipitated from the slurry or the process water, is not constant and also does not increase uniformly. Instead, at first dry mass from the biomass added is present, but this mass is first supposed to be split up and carbonized. With the start of the carbonization reaction, the dry residue clearly decreases, because the original biomass is split up. As condensation starts, the effect reverses again, however, and the dry residue increases again, and now the desired biocoal is contained in the slurry as a load. At this point, however, the biocoal in turn starts to decompose again, and the dry residue clearly decreases again, and then remains more or less constant when the method is clearly extended.

In order to obtain the greatest possible yield of the dry residue of biocoal, the point in time at which the dry residue reaches its maximum must therefore be aimed at. This goal, however, is problematical, because the dry residue cannot be easily determined as a value during ongoing operation. It is true that an ideal time can be determined for certain materials by means of test series, but biomaterials that can be supplied vary so greatly that the required test series would involve an economically unjustifiable effort. This circumstance is all the more true because even different batches of the same materials can already have completely different values.

It has been shown, however, that the progression of the pH value of the slurry in the reaction tank possesses a maximum at approximately the same time as the course of the dry residue. In contrast to the dry residue, however, the pH value can be measured even while the carbonization reaction is taking place, so that a break-off signal for the reaction can practically be generated in real time, at a point in time when the dry residue in the slurry is the greatest and the yield is therefore the highest. For this reason, according to the invention it is not the progression of the dry residue itself that is monitored, but rather, instead, the progression of the pH value. As soon as it is determined, within the carbonization reaction, that a maximum of the pH value has been exceeded, the reaction is terminated. The slurry then to be taken out of the reaction tank possesses the greatest possible dry residue.

In concrete terms, this process can be mastered in that the progression of the pH value of the slurry is detected at specific points in time and placed in memory in a database, and that the measured values are compared with the preceding values. For this purpose, one or more measurement probes can be used, which are assigned to the reaction tank directly or in a bypass line. The measurement values of the at least one measurement probe are evaluated using a process controller, and a maximum of the pH value is sought by means of reconciliation with preceding values. As soon as this maximum value is reached, the reaction is terminated.

The at least one measurement probe can be based on different technical solutions that are known in the state of the art. The two significant solutions relate to potentiometry and measurements by means of ion-sensitive field effect transistors.

Potentiometry makes use of the accumulation of hydrogen ions on the surface of a glass container, so that galvanic tension builds up between the inside and the outside of the glass container. This tension is dependent on the difference in the pH values on the two sides of the surface and can be measured using reference electrodes.

In measurements using field effect transistors, the same effect is utilized, with hydrogen ions accumulating, similar to what was described above, on an ion-sensitive gate membrane of an ion-sensitive field effect transistor. The potential that occurs in this regard can then in turn be measured using measurement technology.

With some advantage, such measurement probes are affixed close to the bottom of the reaction tank, in order to ensure that the probe is always in contact with the slurry and a measurement series that can be evaluated is formed.

By means of additional mixing, the slurry can furthermore be moved in the reaction tank, preferably swirled up, in order to expose the biomass to the pressure and the temperature in the reaction tank as directly as possible from all sides. In this way, a more uniform reaction and therefore a more reliable measurement of the pH value takes place. Mixing can take place by way of mixing nozzles that swirl the slurry up, or by means of a stirring mechanism.

In order not to distort the measurements and not to trigger the termination criteria too soon, a measurement can particularly start when the reaction conditions of hydrothermal carbonization, in terms of pressure and temperature, have been reached and when biomass and hot steam have already been introduced into the reaction container. Only when these processes have been concluded, something that does, however, happen even at the beginning of the reaction, is the measurement started.

If the reaction is terminated with the maximum of the pH value being reached, then this termination can take place, in practical terms, in that the slurry contained in the reaction tank is transferred to a cooling tank. The reaction conditions can thereby be continuously maintained in the reaction tank, so that the energy loss remains as low as possible. For this purpose, the slurry can be pumped out of the reaction tank into a cooling tank, or, preferably, because of the significantly greater pressure in the reaction tank, it can be flushed into the cooling tank at a clearly lower pressure, by means of pressure equalization.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings:

The sole FIGURE shows a diagram of an exemplary progression 1 of the dry residue in %, using a solid line, and, in direct relation to this progression, the progression 2 of the pH value, in a dot-dash line. The first or left upright axis, indicated as pH, represents the pH value, while the second or right upright axis, indicated as TR [%], represents the dry residue in percent. The longitudinal axis is a time axis, with the numbers indicated representing information in minutes.

DETAILED DESCRIPTION OF PREFERRED EMBODIMENTS

The reaction represented in the sole FIGURE starts at the time point t=0 min. First of all, it can be determined that at the beginning of the reaction, the pH value decreases greatly and already reaches a minimum at t=15 min. The dry residue, in contrast, decreases more slowly and only reaches its minimum at about t=60 min. From here on, both the dry residue and the pH value increase uniformly, and both reach a maximum at t=180 min.

The diagram also shows the further development of the two values, in the event that the reaction is not conducted according to the invention. Then pH value and dry residue will clearly decrease and assume a more or less constant value at about t=240 min. Although the dry residue amounts to as much as 17% at its maximum, it lies at 12 to 13% in the case of a longer duration, in other words one-fourth less. Terminating the reaction, according to the invention, when the maximum of the progression of the pH value has been reached, however, ensures that the dry residue does not decrease due to a lack of further reaction. At this point in time, according to the invention, the slurry is removed from the reaction tank, cooled, and subsequently separated from the process water.

What has been described above is therefore a method for conducting a hydrothermal carbonization reaction, which allows a clear reduction in the dwell time of the slurry in the reaction tank, and, at the same time, brings with it a greater yield of biocoal and thereby greater pollutant elimination from the process water.

Although at least one embodiment of the present invention has been shown and described, it is to be understood that many changes and modifications may be made thereunto without departing from the spirit and scope of the invention.

What is claimed is:

1. A method for conducting a hydrothermal carbonization reaction comprising:
   (a) supplying biomass to a reaction tank;
   (b) creating reaction conditions with regard to pressure and temperature required for allowing a hydrothermal carbonization reaction to take place by introduction of steam and maintaining the reaction conditions for a reaction period;

(c) forming a slurry during the reaction period from the steam and the biomass that are introduced;

(d) monitoring the slurry with regard to progression of pH value of the slurry; and (e) terminating the hydrothermal carbonization reaction as soon as a determination is made that a maximum of the pH value has been reached.

2. The method according to claim 1, wherein the progression of the slurry is determined continuously or at discrete time intervals, using at least one measurement probe assigned to the reaction tank, and noted in a database, wherein a process controller compares a current pH value with preceding measurement values from an identical measurement series within the reaction period, and triggers a termination signal when a decrease in pH value that follows an increase phase occurs.

3. The method according to claim 2, wherein the at least one measurement probe is disposed close to a bottom of the reaction tank.

4. The method according to claim 1, wherein the progression of the slurry is determined continuously or at discrete time intervals, using at least one measurement probe assigned to a bypass of the reaction tank, and the pH values are noted in a database, wherein a process controller compares a current pH value with preceding measurement values from an identical measurement series within the reaction period, and triggers a termination signal when a decrease in pH value that follows an increase phase occurs.

5. The method according to claim 1, wherein the slurry is mixed in the reaction tank during the reaction period.

6. The method according to claim 1, wherein measurement begins when the reaction conditions of hydrothermal carbonization, with regard to pressure and temperature, have been reached and biomass and steam have already been introduced into the reaction container.

7. The method according to claim 1, wherein the hydrothermal carbonization reaction is terminated by bringing the slurry out of the reaction tank into a cooling tank via pumping or pressure equalization.

* * * * *